May 15, 1962 B. E. KUIPER 3,035,092
PROCESS FOR THE PRODUCTION OF DICARBOXYLIC ACIDS
Filed Dec. 17, 1958 3 Sheets-Sheet 3

INVENTOR
BARTELD EMIL KUIPER

BY
ATTORNEY

United States Patent Office 3,035,092
Patented May 15, 1962

3,035,092
PROCESS FOR THE PRODUCTION OF DICARBOXYLIC ACIDS
Barteld Emil Kuiper, Wilmington, Del., assignor to E. I. du Pont de Nemours and Company, Wilmington, Del., a corporation of Delaware
Filed Dec. 17, 1958, Ser. No. 781,075
6 Claims. (Cl. 260—533)

This invention is concerned with an improved process for the oxidative conversion of naphthenes to aliphatic dicarboxylic acids containing the same number of carbon atoms as the naphthene. More particularly, this invention is concerned with an improved process for the oxidative conversion of naphthenes to aliphatic dicarboxylic acids in which the naphthene is first oxidized to acid precursors by contact with a gas containing molecular oxygen, and the acid precursors are subsequently oxidized with nitric acid to the dicarboxylic acid.

Aliphatic dicarboxylic acids have in recent years become valuable commodities manufactured in very large volume for such uses as intermediates in the manufacture of plastics and plasticizers. A number of patents have been issued which describe processes for the oxidative conversion of naphthenes to dicarboxylic acids by multi-step oxidations involving first the liquid phase oxidation of the cyclic paraffin to acid precursors, including cyclic alcohols and ketones, by contact wtih a gas containing molecular oxygen followed by conversion of the acid precursors to dicarboxylic acids by oxidation with nitric acid. Such patents include U.S. 2,439,513, issued April 13, 1948, to C. H. Hamblet and A. McAlevy; U.S. 2,557,282, issued June 19, 1951, to C. H. Hamblet and A. McAlevy; U.S. 2,452,741, issued November 2, 1948, to H. W. Flemming; and U.S. 2,825,742, issued March 4, 1958, to A. P. Schueler and Frederick A. Wolff. While a number of these patents have provided valuable commercial processes for the manufacture of dicarboxylic acids, the processes they disclose have all suffered from the defect of producing considerable quantities of undesirable by-products so that the yields of the desired carboxylic acid having the same number of carbon atoms as the initial naphthene have not been particularly high.

It has also been known that improved yields of precursors to the desired dicarboxylic acid could be obtained by operating the initial air-oxidation step at low conversion, preferably considerably under 10%, separating and recycling the unoxidized naphthene. The improvement in yields obtained by low conversion air oxidation of naphthenes in this step of the process has been disclosed in U.S. Patent 2,250,468 issued July 29, 1941, to F. O. Cockerille and in U.S. 2,410,642 issued November 5, 1946, to A. Farkas and A. F. Stribley, Jr. The obvious disadvantage of operating at very low conversions is that extremely large quantities of the naphthene must be fed to the reactor, distilled from the reactor effluent, and pumped back through the recycle system. This involves an undesirably high plant investment and high processing costs, so that any savings from improved yield obtained at low conversion are largely dissipated by these increased costs.

Therefore, it is an object of this invention to provide an improved process for the oxidative conversion of naphthenes in high yields to dicarboxylic acids having the same number of carbon atoms as the naphthene employed as starting material. It is a more specific object of this invention to provide an improved process for the oxidative conversion of naphthenes to dicarboxylic acids in which the naphthene is first subjected to oxidation in the liquid phase with a gas containing molecular oxygen under conditions which minimize the formation of degraded or polymerized by-products, and in which the oxidized product, after separation of unreacted naphthene and, if desired, after refining to separate the volatile precursors of the dicarboxylic acid from non-volatile residues found as by-products, is subjected to further oxidation with nitric acid to yield the aliphatic dicarboxylic acid containing the same number of carbon atoms as the naphthene in high yield at an economic conversion level. It is a specific object of this invention to provide an improved process for the oxidation of cyclohexane to adipic acid in overall yields in the range of 80 to 90%, based on cyclohexane consumed. Other objects and advantages of this invention will appear hereinafter.

It has now been discovered that the objects of this invention can be achieved by the use of a multi-step process for the oxidative conversion of a naphthene (cyclic saturated hydrocarbon) to the aliphatic dicarboxylic acid containing the same number of carbon atoms which comprises the steps of liquid phase, non-catalytic oxidation of the naphthene with a gas containing molecular oxygen, separation and recycle of the unreacted naphthene, and subsequent oxidation of the partially-oxidized product with nitric acid in which the novel improvement comprises subjecting the naphthene, in admixture with its partial oxidation products, alternately to successive oxidizing and reducing steps without separation of reaction products. In a preferred embodiment of this invention, the oxidation of the naphthene by liquid phase air-oxidation is carried out to the extent of 0.1% to about 4% conversion per pass and the reduction of the effluent from the oxidizer is carried to a point where the hydroperoxide concentration in the total effluent from the reduction vessel is reduced below 0.1%, and the successive oxidation and reduction is continued until the total conversion of naphthene to oxidized products is from 2% to 14%. Thereupon unreacted naphthene is separated from the reduced oxidized products and recycled while the concentrated mixture of partial oxidation product is subjected to further oxidation with nitric acid to produce the dicarboxylic acid. Optionally, the concentrated mixture of partial oxidation product can be subjected to a refining step prior to nitric acid oxidation to separate the steam volatile partial oxidation products, which are the precursors to the desired dicarboxylic acid, from the non-volatile, partially condensed residue of oxidation products. Surprisingly, it has been found that when the process is carried out in accordance with the invention disclosed herein, the overyield to the desired discarboxylic acid containing the same number of carbon atoms as the naphthene employed as starting material is higher than can be obtained by previously-known processes such as a process in which the air oxidation is performed by a single pass through the air oxidizers carried to the same conversion.

FIGURE 1 shows a graph which illustrates the improved yields obtained in the oxidation of cyclohexane to adipic acid by the process of this invention. In this graph, the upper line, designated A, shows the yields of adipic acid obtained at total conversion of 2–10% by the use of the process of this invention. For comparison and contrast, the lower line, designated B, shows yields of adipic acid obtained in the same conversion range by a process of the prior art in which the liquid phase air oxidation of cyclohexane is carried out by a single pass through the oxidizers, and in which the oxidized product is subsequently subjected to nitric oxidation without use of a hydrogenation step.

Figure 1:
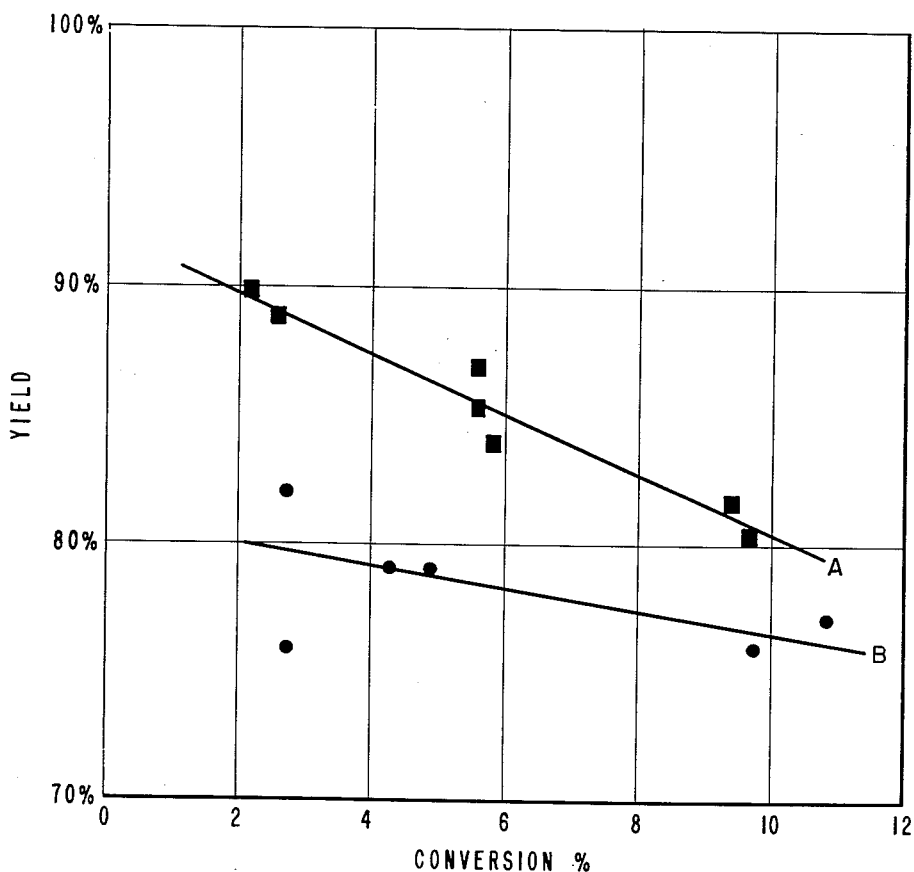

The steps in the subject process involving non-catalytic oxidation of a naphthene in the liquid phase with a gas containing molecular oxygen are carried out in a set of conventional pressured, stirred reactors, generally from one to three reactors in series, designed to provide good contact of the gas, usually air, with the heated hydrocarbon mixture containing partially oxidized products. The temperature of reaction is between 50° and 300° C. at a pressure between about 50 and about 500 p.s.i. gauge. When cyclohexane is the naphthene being oxidized, the preferred oxidation temperature range is from about 150° to 200° C. at a pressure of 150–250 p.s.i.g. Air is passed into the set of stirred reactors at such a rate as to achieve from 0.1% to 14% conversion per pass, the pressure being controlled by venting gases from the top of the reactor. Oxidation catalysts such as the cobalt naphthenates, cobalt stearates, chelate compounds of cobalt, chromium, manganese, vanadium, and the like may not be employed in this liquid-phase air oxidation, since their presence prevents the achievement of substantial advantage from the process of the invention. Such metallic catalysts tend to promote both the rates of oxidation of naphthene and of the decomposition of the hydroperoxides initially formed by the oxidation of naphthenes, and achievement of a yield advantage from the process of the invention requires that substantially no decomposition of the intermediate hydroperoxides occur in the oxidizers. For the same reason, catalytically-inactive materials of construction are preferred for the construction of the oxidizers; glass or ferrous alloys deactivated by treatment to passivate the iron surfaces as by treatment with carbonates, phosphates, meta-phosphates, etc. are quite suitable materials. Decomposition of hydroperoxides can also be reduced by the addition of buffers to control the pH of the reaction mixture and prevent acid or base-catalyzed decomposition of hydroperoxides, although such procedures are not essential to the operation of the invention.

The effluent from the air-oxidation step is passed to a reduction vessel. The reduction may be carried out by well known chemical methods such as stirring with aqueous ferrous sulphate. However, in the preferred embodiment of the invention, catalytic hydrogenation is employed to accomplish the reduction of the intermediate peroxidic reaction products, principally hydroperoxides. Any of the known catalysts for catalytic hydrogenation can be used, such as, for instance, palladium on charcoal, palladium on alumina, Raney nickel or any combination of these. The hydrogenation vessel is pressured with hydrogen to 15–500 p.s.i. gauge at a temperature of 25° to 300° C., and hydrogenation carried out until the concentration of peroxides is reduced substantially and, in the preferred case, until the effluent contains less than 0.1% hydroperoxide. This hydrogenation may also reduce some of the cyclic ketone to cyclic alcohol.

Effluent from the reduction vessel is returned, after catalyst removal and temperature adjustment, to the set of oxidation vessels for further oxidation as described hereinabove. When the desired total conversion of naphthene (usually between 2% and 14%) has been achieved by alternate oxidation and reduction, effluent from the reduction vessel is passed to a fractionation column where unreacted naphthene is taken off overhead, condensed and recycled, together with added naphthene sufficient to replace that oxidized.

The tails from the above fractionation containing the total reduced oxidation products, principally cyclic alcohol, may be passed to the nitric acid oxidation step for conversion to aliphatic dicarboxylic acid. Optionally, the oxidation products may be separated from any tarry, non-volatile by-products by refining, as by steam distillation, prior to the nitric acid oxidation. The nitric acid oxidation of this partially oxidized naphthene product mixture is carried out at a temperature between 30° and 150° C. under pressure greater than atmospheric and preferably between 15 and 500 p.s.i.g. The preferred method of effecting this nitric acid oxidation is in two stages; the first stage is carried out under mild conditions in which the reactants flow around a closed circuit and in the second stage, the products from the first or circulating stage are further oxidized at a somewhat higher temperature from about 90° C. up to 120° C. Details of the operation of the nitric acid oxidation portion of the process are set forth in U.S. Patents 2,439,513 and 2,557,282 of C. H. Hamblet and A. McAlevy. Aqueous nitric acid solutions of 30–70%, preferably 50–60% strength, based on volatile content, are employed together with a suitable catalyst. The preferred catalysts for this nitric acid oxidation are mixtures containing dissolved copper salts and dissolved vanadium or manganese salts. The total concentration of catalyst employed is in the range of 0.01–0.5 part by weight based on the nitric acid solution fed.

The aliphatic dicarboxylic acid is recovered by cooling the nitric acid solution and filtering the crystallized acid. The desired dicarboxylic acid containing the same number of carbon atoms as the naphthene is recovered in higher yield and purity than described by Hamblet et al.

Figure 2:
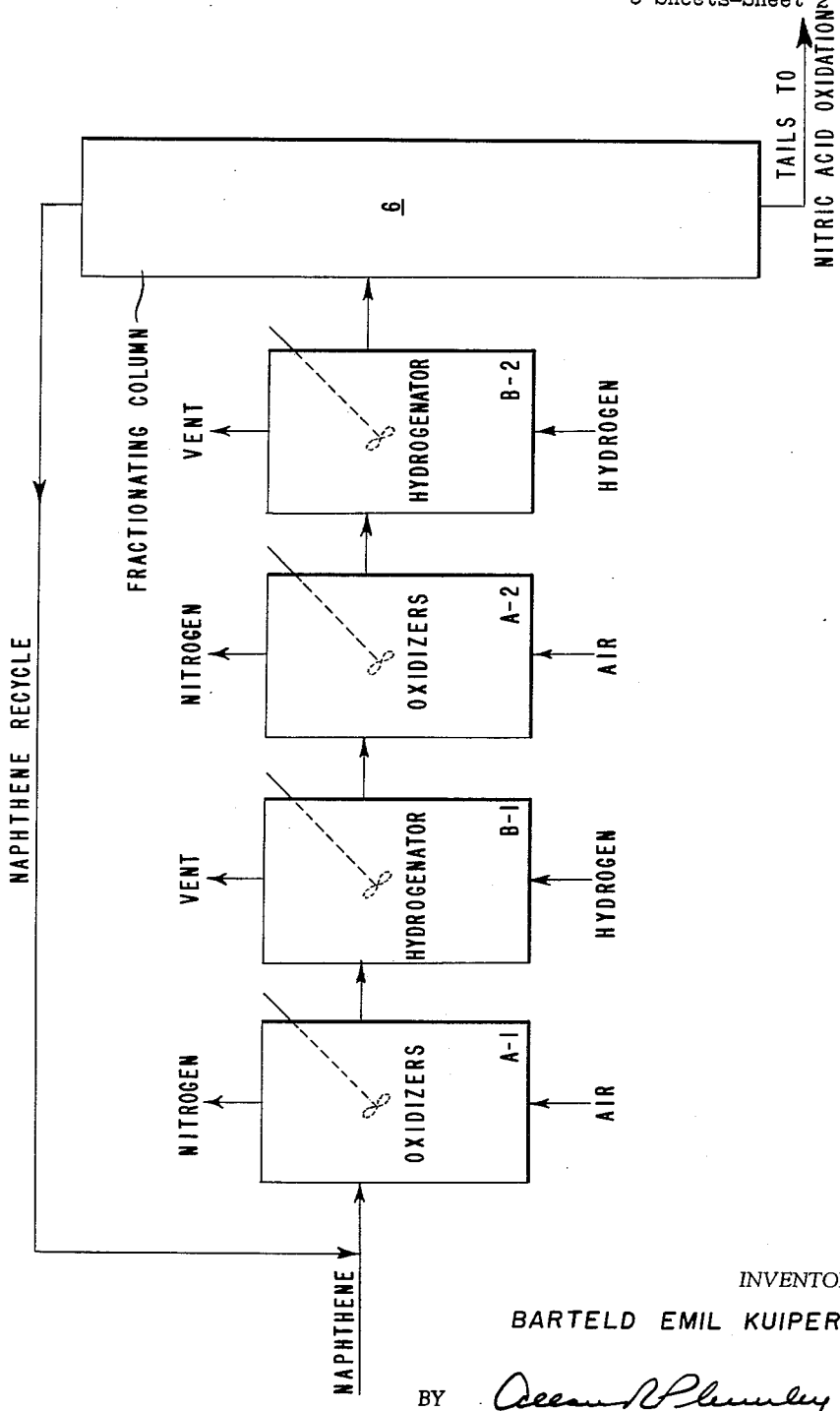
FIGURE 2 is a diagrammatic representation of one method for carrying out the process of the invention continuously as hereinafter set forth in detail.

One method for carrying out in a continuous manner the successive air oxidation and hydrogenation steps of the subject process is indicated diagrammatically in FIGURE 2. The naphthene-containing reaction mixture is pumped successsively through a series of oxidation vessels, designated A–1, A–2, etc., and hydrogenation vessels, designated B–1, B–2, etc. consisting of from one to six or more oxidation vessels arranged in sets of from one to three oxidizers with a hydrogenation vessel between each set of oxidation vessels and at the end of the series. The unreacted naphthene is separated from the effluent from the final hydrogenation vessel by fractional distillation in a column designated 6, and recycled to the first oxidation vessel, A–1, together with sufficient additional cyclic paraffin to replace that oxidized. Tails from the column, 6, are passed to the nitric acid oxidizer. Not shown on the diagram are auxiliary equipment, such as means for adjusting temperature and for removing catalyst particles, between A–1 and B–1 and A–2 and B–2, etc. or between B–1 and A–2, and B–2 and the next oxidation vessel.

Figure 3:
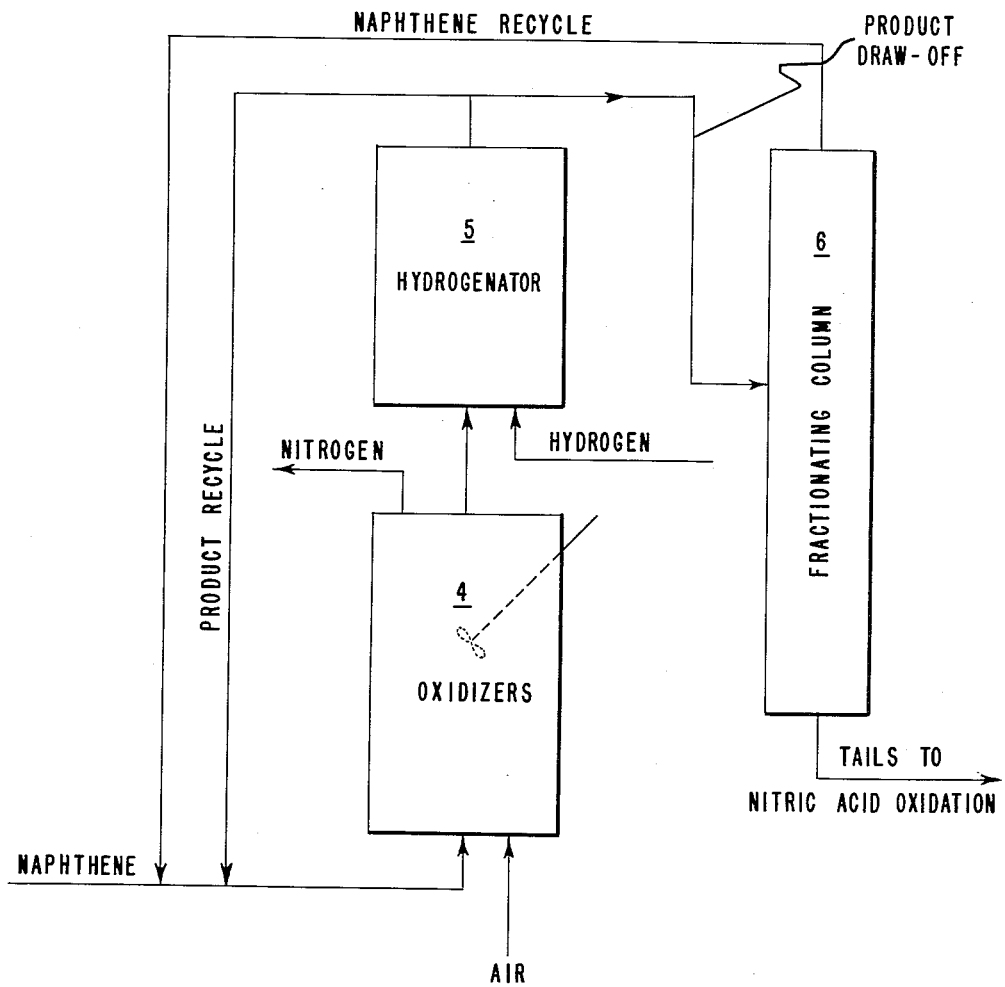
FIGURE 3 is a diagrammatic representation of another modification for carrying out the process of the invention continuously as described in detail below.

Another method for carrying out in a continuous manner the successive air-oxidation and hydrogenation steps of the subject process is indicated diagrammatically in FIGURE 3. According to this modification of the process, the naphthene in admixture with its partial oxidation products is circulated around a cyclic recycle circuit consisting essentially of a set of from one to three oxidation vessels, designated by 4, and a hydrogenation vessel, 5. Air is fed into the bottom of the stirred oxidizers, and nitrogen, together with any volatile oxidation product, is vented from the top. The reaction mixture is circulated at such a rate that from 0.1% to about 4% conversion of cyclohexane to partial oxidation products occurs in each pass through the set of oxidation vessels. The effluent from the oxidizers, 4, is passed into the hydrogenation vessel, which is charged with a hydrogenation catalyst and pressured with hydrogen under 15 to 500 p.s.i.g. at 25° to 300° C., whereby the concentration of hydroperoxide is reduced substantially and the cyclic ketone may be partially converted to cyclic alcohol. The effluent from the hydrogenation vessel is recycled to the oxidizer by passing through filters and heating coils. The concentration of oxidized products in the recycling mixture is maintained at a constant level between 2% and 14% by drawing off a portion of the effluent from the hydrogenator and replacing it with naphthene added to the recycling mixture ahead of the oxidizer. The product drawn off is passed to the fractionation column, 6, where the naphthene is distilled off overhead and recycled while the tails are pumped to the nitric acid oxidizer, optionally through a refining step to remove non-volatile tars.

The process of the subject invention may also be carried out by batch operation. Generally, batch operation is less attractive commercially, but it is particularly useful in laboratory studies of the process such as in the following examples:

EXAMPLE 1

A stirred autoclave was charged with cyclohexane and heated to 175° C. Air was introduced until the pressure reached 180 p.s.i.g., while pressure was maintained by venting nitrogen and adding air until about 1.5% of the initial charge was converted to oxidized products (1.5% conversion). The total charge was rapidly cooled to 35° C., the pressure vented, and a supported hydrogenation catalyst added and the vessel pressured to about 300 p.s.i.g. with hydrogen for 15–20 minutes. The product was then discharged and filtered. This constitutes one oxidation-hydrogenation step. The oxidation-hydrogenation step was repeated several times. One result of the hydrogenation was shown to be the conversion of hydroperoxides, as measured by their reaction with HI, to compounds other than hydroperoxides, principally cyclohexanol. Thus, while the hydroperoxide concentration before hydrogenation ranged from 1.2 to 1.8%, calculated as cyclohexylhydroperoxide, the concentration of hydroperoxides after hydrogenation was from 0.04 to 0.08%.

After a series of four such oxidation-hydrogenation steps, the total conversion was 6%, and the yield to adipic acid on nitric acid oxidation of the product was 85% as compared with 78% yield in a comparative run without hydrogenation in which the oxidation was carried on continuously to the same 6% total conversion. Improved yield to adipic acid precursors was obtained by the operation of the process of the invention even when compared with the case where the product from a one-step oxidation was subjected to hydrogenation after air-oxidation, so that it is shown that a surprising synergistic effect resulting in significant yield improvement may be achieved by the process of this invention.

EXAMPLE 2

Six thousand grams of 98% cyclohexane and 40 g. of finely-powdered disodium phosphate, as buffer, were charged into a stainless steel stirred autoclave. The autoclave was flushed with nitrogen and heated to 175° C. Air was introduced at a rate of 27 standard cubic feet per hour, and the pressure was maintained at 180 p.s.i.g. by venting gas. When approximately 2% of the cyclohexane had been converted, the total charge was rapidly cooled and the pressure vented. At 35° C., 5 g. of 10% palladium on charcoal was added and the autoclave pressured to 300 p.s.i.g. with hydrogen. After 30 minutes, substantially all of the hydroperoxide was decomposed, and the product was discharged and filtered to remove the catalyst and disodium phosphate. This oxidation-hydrogenation step was repeated four times for a total of five such steps. Measurement of the total oxygenated material in the final product showed that 9.5% of the cyclohexane charged had been oxidized. The reaction mixture was fractionally distilled to separate the unconverted cyclohexane overhead and to leave the total oxygenated material in the tails. The total tails from the fractionation were subjected to a standard nitric oxidation as described hereinabove. From each gram of carbon in the oxidized material charged to the nitric acid oxidation, 1.70 grams of adipic acid was obtained, so that at 9.5% conversion in the air-oxidation-reduction portion of the process, 82% of the cyclohexane oxidized was converted to adipic acid. This is shown as run 6 in Table I.

Table I also lists the results of other similar experiments employing 2, 4, and 5 oxidation-reduction steps at total conversions of from 2.2% to 9.8% which gave yields of adipic acid in the range of 80.5% to 89.5%.

For comparison and contrast, Table II shows the yields of adipic acid obtained by the nitric acid oxidation of the partial oxidation product of cyclohexane obtained in normal air-oxidations of cyclohexane using a cobalt naphthenate catalyst and carried to conversions ranging from 2.6% to 11.0%. FIGURE 1 shows graphically the improvement obtained by the use of the novel process of this invention (line A) as compared with normal prior art process (line B).

While the examples have illustrated the process of this invention as applied to the conversion of cyclohexane to adipic acid, it is also possible, in accord with this invention, to convert other cyclic hydrocarbons to other aliphatic dicarboxylic acids. Thus cyclopentane and cyclobutane can be oxidized, by the process of this invention, to glutaric and succinic acids, respectively. While the process of the invention yields predominantly dicarboxylic acids having the same number of carbon atoms as the cyclic hydrocarbon oxidized, small proportions of dicarboxylic acids having fewer carbon atoms may be formed as by-products.

Table I.—*Oxidation of Cyclohexane to Adipic Acid by the Process of the Invention*

| Run No. | Number of Steps [1] | Total Conversion (Air-Oxidation), Percent | Yield of Adipic Acid After HNO$_3$ Oxidation, Percent |
|---|---|---|---|
| 1 | 2 | 2.2 | 89.5 |
| 2 | 2 | 2.5 | 89.0 |
| 3 | 4 | 5.7 | 87.1 |
| 4 | 4 | 5.6 | 85.0 |
| 5 | 5 | 9.8 | 80.3 |
| 6 | 5 | 9.5 | 82.0 |
| 7 | 5 | 5.8 | 84.0 |

[1] Each step consists of air-oxidation followed by hydrogenation.

Table II.—*Oxidation of Cyclohexane to Adipic Acid by Prior Art Process*

| Run No. | Total Conversion (Air-Oxidation), Percent | Yield of Adipic Acid After HNO$_3$ Oxidation, Percent |
|---|---|---|
| 8 | 2.6 | 82.0 |
| 9 | 2.6 | 76.0 |
| 10 | 4.2 | 79.0 |
| 11 | 4.8 | 79.0 |
| 12 | 9.9 | 76.0 |
| 13 | 11.0 | 77.0 |

I claim:

1. In a continuous, multi-step process for the oxidative conversion of cyclohexane to adipic acid which consists essentially of the steps of liquid phase non-catalytic oxidation of cyclohexane with air at a temperature between 50° and 300° C. under a pressure of between about 50 and about 500 p.s.i.g., separation and recycle of unreacted cyclohexane, and subsequent oxidation of partially-oxidized products with aqueous nitric acid solution of 30–70% strength in the presence of dissolved copper and vanadium salts and at a temperature between 30° and 150° C. under a pressure between about 15 and 500 p.s.i.g., the improvement of passing the cyclohexane, in admixture with its partial oxidation products, successively through an alternating series of sets of air-oxidation vessels and catalytic hydrogenation vessels at a rate such that from 0.1 to 14% conversion of cyclohexane to partial oxidation products occurs in each set of oxidation vessels and such that catalytic hydrogenation at between 25° and about 300° C. under 15 to 500 p.s.i.g. of hydrogen in the presence of a hydrogenation catalyst selected from the group consisting of palladium supported on charcoal, palladium supported on alumina, and Raney nickel, reduces substantially the hydroperoxide content of the mixture leaving each hydrogenation vessel, continuing said successive oxidation and hydrogenation until the total conversion of cyclohexane to oxidized products is from 2 to 14%, separating unreacted cyclohexane for recycle by fractional distillation of the effluent from the final hydrogenation vessel, and subjecting oxidized product in the tails to the aforesaid nitric acid oxidation.

2. A process according to claim 1 wherein the air oxidation in each set of oxidizers is carried out to the extent of 0.1% to 4% conversion of cyclohexane to partial oxidation products and wherein the catalytic hydrogenation in each hydrogenation vessel is carried to the point where the hydroperoxide content of the mixture leaving each hydrogenation vessel is below about 0.1%.

3. In a continuous, multi-step process for the oxidative conversion of cyclohexane to adipic acid which consists essentially of the steps of liquid phase, non-catalytic oxidation of cyclohexane with air at a temperature between 50° and 300° C. under a pressure of between about 50 and about 500 p.s.i.g., separation and recycle of unreacted cyclohexane, and subsequent oxidation of partially-oxidized products with aqueous nitric acid solution of 30–70% strength in the presence of dissolved copper and vanadium salts and at a temperature between 30° and 150° C. under a pressure between about 15 and 500 p.s.i.g., the improvement of passing the cyclohexane, in admixture with its partial oxidation products, continuously around a recycle system consisting essentially of a set of oxidation vessels and a hydrogenation vessel, the reactants being passed continuously from the set of oxidation vessels to the hydrogenation vessel, and from the hydrogenation vessel to the set of oxidation vessels, at such a rate that from 0.1 to about 4% conversion of cyclohexane to partial oxidation products occurs in each pass through the set of oxidation vessels and such that catalytic hydrogenation, at 25° to 300° C. under 15 to 500 p.s.i.g. of hydrogen in the presence of a hydrogenation catalyst selected from the group consisting of palladium supported on charcoal, palladium supported on alumina, and Raney nickel, reduces substantially the hydroperoxide content of the mixture leaving the hydrogenation vessel, the composition of the circulating liquid mixture being maintained constant by drawing off a portion of the product solution after the hydrogenator and replacing it with cyclohexane added to the recycling mixture ahead of the set of oxidizers, the rate of draw-off being such that the concentration of partially-oxidized products in the circulating stream is maintained between 2% and 14%, and separating unreacted cyclohexane for recycle by fractional distillation of said drawn-off product solution, and subjecting the steam volatile component of the oxidized products in the tails to the aforesaid nitric acid oxidation.

4. In a continuous, multi-step process for the oxidative conversion of a naphthene to an aliphatic dicarboxylic acid containing the same number of carbon atoms as the naphthene, which process consists essentially of the steps of liquid phase, non-catalytic partial oxidation of said naphthene at a temperature between 50° and 300° C. under a pressure between about 50 and about 500 p.s.i.g. with a gas containing molecular oxygen, separation and recycle of unreacted naphthene, and subsequent oxidation of the products of the aforesaid partial oxidation to give the aforesaid dicarboxylic acid by treatment with aqueous nitric acid in the presence of a catalyst consisting of a mixture of dissolved copper salts with at least one other dissolved metal salt selected from the group consisting of vanadium salts and manganese salts, the improvement of subjecting the naphthene, in admixture with its partially oxidized products, successively and alternately to multiple non-catalytic partial oxidation steps with a gas containing molecular oxygen and to multiple catalytic hydrogenation steps at a temperature in the range of 25° to 300° C. under a hydrogen pressure in the range of 15 to 500 p.s.i.g. in the presene of a hydrogenation catalyst selected from the group consisting of palladium supported on charcoal, palladium supported on alumina, and Raney nickel.

5. A process according to claim 4 wherein the naphthene oxidized is cyclohexane.

6. In a continuous, multi-step process for the oxidative conversion of cyclohexane to adipic acid which process consists essentially of the steps of liquid phase, non-catalytic partial oxidation of cyclohexane with air at a temperature between about 150° and 200° C. under a pressure of 150 to 250 p.s.i.g., separation and recycle of unreacted cyclohexane, and subsequent production of adipic acid by oxidation of the products of the aforesaid partial oxidation by treatment with aqueous nitric acid in the presence of a catalyst consisting of a mixture of dissolved copper salts with at least one other dissolved metal salt selected from the group consisting of vanadium salts and manganese salts, the improvement of subjecting the cyclohexane, in admixture with its partially oxidized products, successively and alternately to multiple non-catalytic air-oxidation steps and catalytic hydrogenation steps without separation of products, said oxidizing steps being carried out to the extent of 0.1 to about 4% conversion of cyclohexane per pass, and said catalytic hydrogenation steps consisting of hydrogenation at a temperature in the range of 25° to 300° C. under a hydrogen pressure in the raneg of 15 to 500 p.s.i.g. in the presence of a hydrogenation catalyst selected from the group consisting of palladium supported on charcoal, palladium supported on alumina, and Raney nickel, and said successive, alternate non-catalytic air-oxidations and catalytic hydrogenations being continued until the total conversion of cyclohexane to oxidized products is from 2 to 14%.

References Cited in the file of this patent

UNITED STATES PATENTS

| 2,497,349 | Farkas et al. | Feb. 14, 1950 |
| 2,790,004 | Dougherty | Apr. 23, 1957 |
| 2,844,626 | Kamlet | July 22, 1958 |
| 2,851,496 | Cates et al. | Sept. 9, 1958 |

OTHER REFERENCES

Hawkins: Quarterly Reviews, vol. 4 (1950), pp. 251–271.

UNITED STATES PATENT OFFICE

CERTIFICATE OF CORRECTION

Patent No. 3,035,092                                May 15, 1962

Barteld Emil Kuiper

It is hereby certified that error appears in the above numbered patent requiring correction and that the said Letters Patent should read as corrected below.

Column 2, lines 47 and 48, for "overyield" read -- overall yield --; column 8, line 41, for "raneg" read -- range --.

Signed and sealed this 28th day of August 1962.

(SEAL)
Attest:

ESTON G. JOHNSON                              DAVID L. LADD

Attesting Officer                                Commissioner of Patents